UNITED STATES PATENT OFFICE.

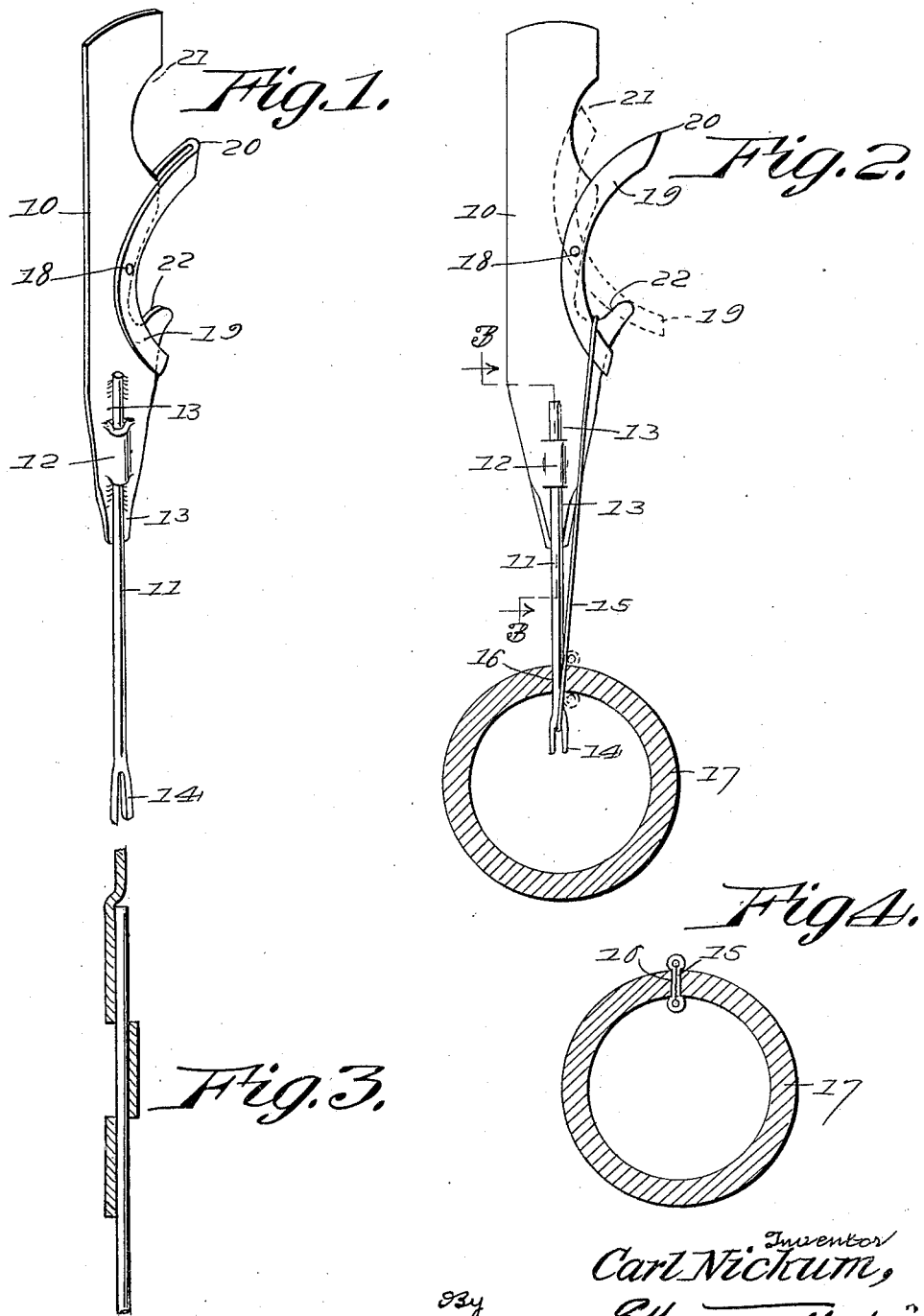

CARL NICKUM, OF ZION, ILLINOIS.

TIRE-REPAIR TOOL.

1,363,163.   Specification of Letters Patent.   Patented Dec. 21, 1920.

Application filed December 4, 1919. Serial No. 342,468.

*To all whom it may concern:*

Be it known that I, CARL NICKUM, a citizen of the United States of America, residing at Zion, in the county of Lake and State of Illinois, have invented new and useful Improvements in Tire-Repair Tools, of which the following is a specification.

The object of the invention is to provide a simple and efficient means whereby a tire plugging elastic band may be readily inserted and released in a tire puncture without the loss of time and inconveniences ordinarily experienced in this operation and when the emergency repair of a tire is necessary, and to this end the same consists of a construction and combination of parts hereinafter described, it being understood that changes in form and proportion may be made within the scope of the appended claims without departing from the principles involved.

In the drawing:

Figure 1 is a perspective view of the tool.

Fig. 2 is a side view showing the same in the course of insertion of the band through the tire puncture.

Fig. 3 is a detail sectional view on the plane indicated by the line 3—3 of Fig. 2 to show the means of attachment of the needle to the stock.

Fig. 4 is a view of the tire with the plug in its puncture-stopping position.

The tool consists of a stock 10 which may be formed of sheet or plate metal, and to it is attached a needle 11 held in place by means of an up-struck loop 12 and a grooved seat 13 formed in the plate above and below the loop, it being obvious that after inserting the needle pressure may be applied to the material of the stock to lock the parts in their operative relations. At its free end the needle is provided with a bifurcation 14 for engagement with the rubber band 15 which is to be inserted through the puncture 16 in the tire or tube 17.

Pivotally mounted upon the stock, as at 18, is a cast-off 19 also formed of sheet metal folded upon itself, as at 20, to straddle the edge of the stock, one end of the cast-off being accessible to the fingers of the operator by reason of extending across a finger notch 21 in the stock, the latter adjacent the other end of said cast-off being provided with a seat 22 for engagement with the loop at the opposite end of the rubber band.

It will be seen that by engaging a rubber band respectively with said bifurcation 14 and seat 22, the band being continuous and the cast-off being in the position indicated in Fig. 1 and in full lines in Fig. 2, the needle may be introduced into the puncture of the tire to carry one end of the rubber band thereinto, as shown in Fig. 2, and that whenever desired by the operator the cast-off may be thrown to the dotted line position indicated in Fig. 2 to throw the band therefrom so that when the needle is withdrawn the contraction of the band will leave it substantially in the position indicated in Fig. 4 to fill and close the puncture.

It will be understood moreover that a tool such as described can be manufactured at small cost and that by reason of its construction, the effective introduction of the band may be accomplished with the minimum expenditure of time and effort upon the part of the operator, the release of the band not being effected until the inner end thereof is properly positioned, and the band being held under tension and hence in transversely reduced form during the insertion and while the proper positioning of the inserted portion thereof is being effected.

What is claimed is:

1. A device for the purpose described having a stock provided with a terminally bifurcated needle for engagement with one end of a plugging band, and a pivotal cast-off carried by the stock and coöperating with a seat formed in the latter for engagement with the other end of said band.

2. A tool for the purpose described having a sheet metal stock provided with an up-struck loop and adjacent alined seats, a needle having its shank arranged in said seats and engaged with the loop, the free end of said needle being bifurcated, and a movable cast-off mounted upon the stock and coöperating with a seat formed in the latter for a plugging band engaged with the bifurcation of said needle.

3. A device for the purpose described having a stock provided with a terminally bifurcated needle for engagement with a plugging band and insertion through a tire puncture, and a cast-off pivotally mounted upon the stock and coöperating with a seat formed in the latter and facing away from the bifurcated extremity of the needle for engagement with the other end of the plugging band for maintaining the latter under tension, the free end of said cast-off being disposed adjacent to a finger notch in the stock.

4. A tool for the purpose indicated having a stock provided with a terminal bifurcated needle for engagement with one end of a plugging band, the stock being formed with a seat for engagement with the other end of said band, and a cast-off pivotally mounted on the stock and straddled by the band engaging the seat and bifurcated end of the needle respectively, the stock being formed with a finger notch to permit of manipulation of the cast-off.

In testimony whereof I affix my signature.

CARL NICKUM.